(12) United States Patent
Vanderbeke et al.

(10) Patent No.: US 8,911,178 B2
(45) Date of Patent: Dec. 16, 2014

(54) DEVICE AND METHOD FOR ERECTING AT SEA A LARGE SLENDER BODY, SUCH AS THE MONOPILE OF A WIND TURBINE

(75) Inventors: Koen Vanderbeke, Erps-Kwerps (BE); Bart Achiel Alfons De Poorter, Melle (BE); Bart Ingrid Jack Brouwers, Antwerpen (BE)

(73) Assignee: Geosea N.V., Zwijndrecht (BE)

( * ) Notice: Subject to any disclaimer, the term of this patent is extended or adjusted under 35 U.S.C. 154(b) by 860 days.

(21) Appl. No.: 13/074,810

(22) Filed: Mar. 29, 2011

(65) Prior Publication Data
US 2011/0258829 A1    Oct. 27, 2011

(30) Foreign Application Priority Data

Mar. 29, 2010    (EP) .................................... 10158186

(51) Int. Cl.
| | | |
|---|---|---|
| *E02D 27/52* | (2006.01) | |
| *F03D 11/04* | (2006.01) | |
| *E02B 17/02* | (2006.01) | |
| *E02D 27/42* | (2006.01) | |
| *F03D 1/00* | (2006.01) | |
| *E02B 17/00* | (2006.01) | |

(52) U.S. Cl.
CPC .............. *F03D 1/001* (2013.01); *F03D 11/045* (2013.01); *Y02E 10/727* (2013.01); *E02B 17/027* (2013.01); *E02D 27/42* (2013.01); *F05B 2230/60* (2013.01); *E02B 2017/0091* (2013.01); *F05B 2240/95* (2013.01); *E02B 2017/0039* (2013.01); *E02B 2017/0065* (2013.01); *E02B 2017/0056* (2013.01)
USPC ....................................................... 405/209

(58) Field of Classification Search
USPC .......................................... 405/203, 209, 196
See application file for complete search history.

(56) References Cited

U.S. PATENT DOCUMENTS

| 2,924,047 | A | | 2/1960 | Peterson | |
|---|---|---|---|---|---|
| 3,036,438 | A | * | 5/1962 | Sims ............................. | 405/206 |
| 3,433,024 | A | * | 3/1969 | Diamond et al. ............ | 405/196 |
| 3,511,057 | A | * | 5/1970 | Suter ............................ | 405/196 |

(Continued)

FOREIGN PATENT DOCUMENTS

| DE | 202009006507 U1 | 8/2009 |
|---|---|---|
| EP | 0945338 A1 | 9/1999 |

(Continued)

OTHER PUBLICATIONS

European Search Report (EP 10 15 8186) dated Sep. 1, 2010.

*Primary Examiner* — John Kreck
(74) *Attorney, Agent, or Firm* — Novak Druce Connolly Bove+ Quigg LLP

(57) ABSTRACT

The invention relates to a method for erecting at sea a large slender body, such as the monopile of a wind turbine. The method comprises bringing the large slender body in a substantially horizontal floating condition at least partly underneath the work deck of a platform, attaching a tension cable to the slender body, and pulling on the tension cable using fixations means and guiding means that are provided at an edge of the work deck and are connected to it to gradually bring the slender body in an erected position along the edge of the work deck. The slender body is optionally driven into the under water bottom. The invention also relates to a device for performing the method. The method is reliable and obviates the use of large cranes.

21 Claims, 7 Drawing Sheets

(56) References Cited

U.S. PATENT DOCUMENTS 3,805,534 A * 4/1974 Brasted ............... 405/228
4,161,376 A * 7/1979 Armstong ............ 405/196
4,293,239 A * 10/1981 Petty et al. ........... 405/203
4,722,640 A * 2/1988 LeTourneau ......... 405/196

FOREIGN PATENT DOCUMENTS

| FR | 2876123 A1 | 4/2006 |
| GB | 1190688 A | 5/1970 |
| GB | 2170250 A | 7/1986 |
| GB | 2442323 A | 4/2008 |

* cited by examiner

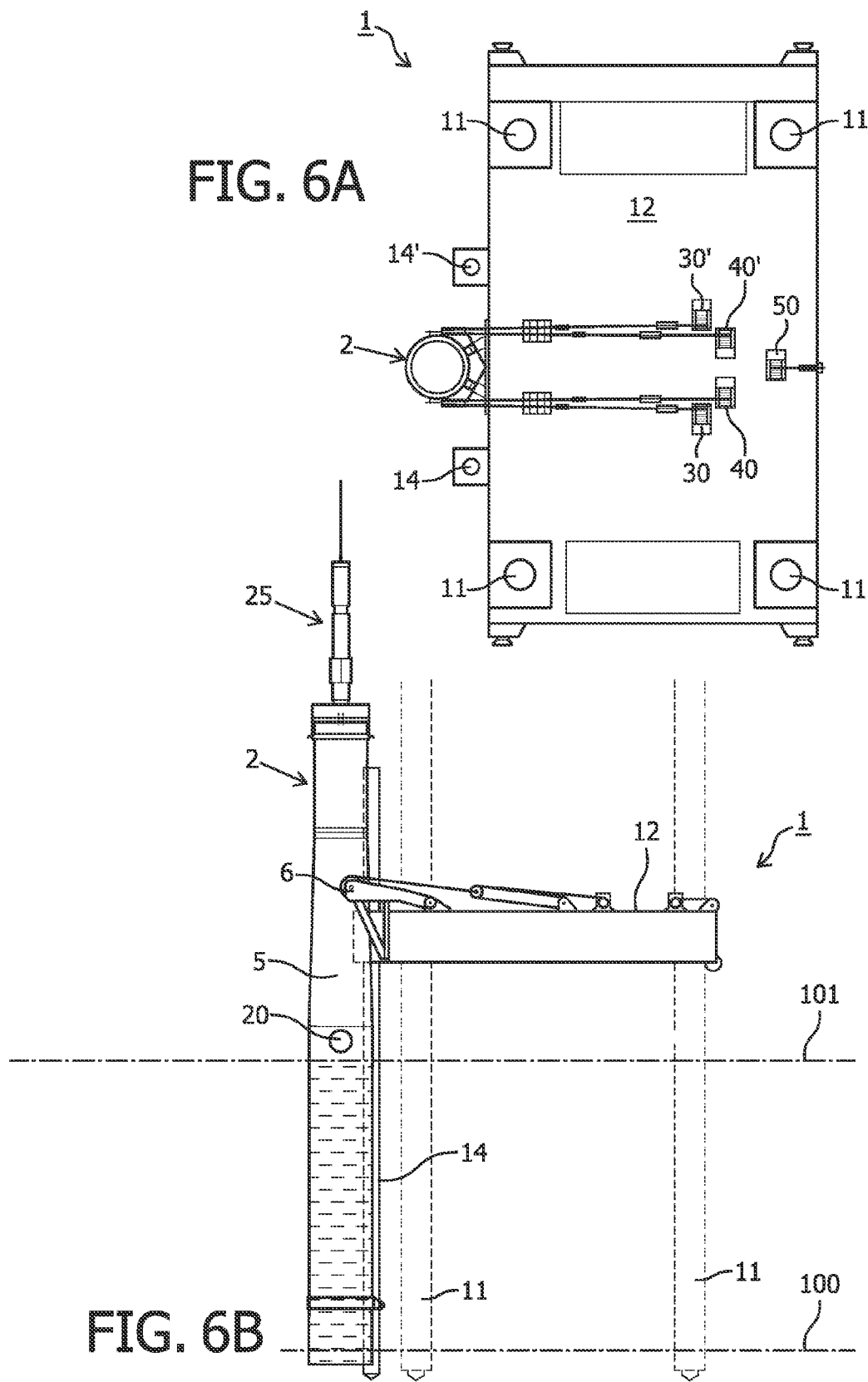

DEVICE AND METHOD FOR ERECTING AT SEA A LARGE SLENDER BODY, SUCH AS THE MONOPILE OF A WIND TURBINE

FIELD OF THE INVENTION

The invention relates to a device for erecting at sea a large slender body, such as the monopile of a wind turbine. The invention also relates to a method for erecting at sea such a large slender body, and to a method for installing an elevated mass, such as a wind turbine, onto a monopile.

The invention will be explained below with reference to an offshore wind turbine. The reference to a wind turbine does not imply any limitations of the scope and extent of the invention. The method may equally be applied to any other large elongated slender body, such as other off-shore foundation structures, jetties, radar and other towers.

BACKGROUND

The supporting structure of a wind turbine at sea usually has a slender design. The supporting structure of an offshore wind turbine for instance typically comprises a turbine tower and a lower portion in the form of a trussed structure, referred to as a jacket. Apart from such a jacket construction, many wind turbines are supported by a so-called monopile. Monopiles are large slender bodies, usually hollow steel or concrete cylinders that may achieve lengths of 50 m and more, diameters of 6 m and more, and weights of 500 to 800 tons and more. Monopiles are huge structures and in fact may be compared to tunnel tube sections. The foundation of a wind turbine of this type comprises a monopile and a transition piece grouted thereon, and forming the connection between the monopile and the turbine tower. It is clear from the above description that a lame part of the monopile extends under water where it takes support onto a resistant substrate in the seabed.

Due to its vast dimensions, a monopile is particularly difficult and expensive to handle. A known method for erecting at sea such a large slender body comprises the use of a jack-up platform on which is provided a large crane able to support the load of the monopile. The monopile is typically transported from the shore to the off-shore platform by closing off its two open ends with closure caps of steel or another suitable material, and letting it float in a substantial horizontal position. The floating monopile (due to the enclosed volume of air) is then dragged to the off-shore platform where it is handled by the crane.

Another known method makes use of a heavy lifting vessel. Such as self-propelling vessel typically has a number of monopiles on board and also uses a crane to upend monopiles, place them in a pile gripper and drive them into the seabed.

The above manipulations of the known method are time-consuming, and, in a typical ease, may take as long as 5 to 7 days to be completed.

SUMMARY OF THE INVENTION

It is an object of the present invention to provide a device and method for erecting at sea a large slender body, such as the monopile of a wind turbine, in a more efficient manner than known hitherto, i.e. may require less time than the known method.

According to the invention, this object is achieved by a device comprising a jack-up platform provided with spud poles for taking support onto an underwater bottom, and with a work deck to which are connected fixation means for a tension cable and guiding means that are provided at an edge of the work deck, whereby in operation the tension cable is attached to the fixation means, is guided along the guiding means and attached to the large slender body, the fixation means being adapted to lengthen or shorten the tension cable.

Another embodiment of the device according to the invention is characterized in that to the work deck are connected further fixation means for a further tension cable, and further guiding means that are provided at an edge opposite the edge of the guiding means, whereby in operation the further tension cable is attached to the large slender body at a rear end thereof, the further fixation means being adapted to lengthen or shorten the further tension cable.

In still another embodiment of the device, the fixation means comprise first and second fixation means, whereby in operation the tension cable is attached to the first fixation means, is guided along the guiding means and around attachment means, provided on the large slender body and led back along the guiding means to the second fixation means to form a sling, the fixation means being adapted to lengthen or shorten the sling.

In another embodiment of the invention, a device is provided wherein the device comprises two pairs of first and second fixation means, and two tension cables.

In still another embodiment, the device according to the invention is characterized in that the fixation means and/or further fixation means comprise (drum) winches. Even more preferred is a device wherein the fixation means and/or further fixation means comprise a movable pulley.

To further improve the load bearing capacity of the device, the fixation means and/or further fixation means in an embodiment comprise a compound pulley, i.e. a combination of a fixed and a movable pulley. Most preferred is to use a compound pulley comprising a block and tackle. A block and tackle is a compound pulley where several sheaves are mounted on each axle, further increasing the mechanical advantage. Block and tackles usually lift objects with a mechanical advantage greater than 2.

In another embodiment of the device according to the invention, the guiding means comprise a hoist bracket that extends over the edge of the work deck and is provided with a sheave.

A particularly preferred embodiment of the device according to the invention is characterized in that the fixation means and/or further fixation means comprise linear winches. Linear winches are able to pull large loads. The use of linear winches makes it possible to omit the use of pulleys, and therefore save space on the work deck of the jack-up platform. Linear winches are known per se and comprise a steel frame designed to withstand a rated load with an adequate safety factor, and at least two cable grips, one of which may be an integral part of the frame and the other is guided by runners and moved by two hydraulic cylinders. A continuous pulling winch uses two movable cable grips guided by runners and moved by two hydraulic cylinders. The at least two cable grips catch the cable intermittently thereby allowing to pull or pay out the cable, as desired. A hydraulic power unit is used to power the linear winch, and the winch may be equipped with a remote control system, if desired. The power unit may be equipped with an automatic system for reading and correcting the movements of the grips in real time so as to keep the winches synchronized.

In another preferred embodiment a combination of roll winches, pulleys, linear winches is used.

Another preferred embodiment of the device according to the invention is characterized in that the platform comprises additional spud poles arranged at the edge of the work deck on both sides of the guiding means and in proximity thereof.

The invention also relates to a method for erecting at sea a large slender body, such as the monopile of a wind turbine. The method comprises:
- providing a device according to any one of the preceding claims;
- with the platform in a jacked-up position, bringing the large slender body in a substantially horizontal floating condition at least partly underneath the work deck of the platform such that a top end thereof is underneath the edge of the guiding means and a rear end thereof is underneath the edge of the further guiding means;
- attaching the tension cable to the slender body; and
- pulling on the tension cable using the fixations means and thereby;
- gradually bringing the slender body in an erected position along the edge of the work deck; and optionally
- driving the slender body into the under water bottom.

In a preferred embodiment of the invention, a method is provided wherein a further tension cable is attached to the large slender body at the rear end thereof, and the further tension cable is lengthened or shortened by the further fixation means.

Another embodiment of the invention provides a method wherein the fixation means comprise first and second fixation means, and wherein the tension cable is attached to the first fixation means, is guided along the guiding means and around attachment means, provided on the large slender body and led back along the guiding means to the second fixation means to form a sling.

Even more preferred is a method wherein the device comprises two pairs of first and second fixation means, and two tension cables that are each attached to the first fixation means of a pair, guided along the guiding means and around attachment means, provided on the large slender body and led back along the guiding means to the second fixation means of said pair to form a sling.

It has advantages to characterize the method according to the invention by an embodiment in which the attachment means of the large slender body are located between the top end thereof and its center of gravity, and more preferably relatively close to its center of gravity.

When using the method for erecting a monopile of a wind turbine, the erected monopile is according to an embodiment driven into the substrate by a hydraulic hammer after it has been erected, i.e. put in a substantially vertical position along an edge of the work deck of the platform. A hydraulic hammer, optionally with follower, is known per se to the skilled person.

The invention further relates to a method for installing an elevated mass, such as a wind turbine, onto a monopile, the method comprising the method steps according to the invention as elucidated above in more detail, and the step of connecting the wind turbine to the erected monopile. Connecting the wind turbine tower to the monopile may conveniently be carried out by grouting a transition piece on the monopile, and forming the connection between the monopile and the turbine tower.

Although the method according to the invention may be applied to provide a foundation for any erected structure, the method is preferably applied to a structure that is founded onto a substrate under water.

The method according to the invention is further in particular suitable for cylindrical hollow monopiles having a length of at least 20 m, more preferably at least 40 no and most preferably at least 60 m, and a weight of at least 300 tons, more preferably at least 500 tons, and most preferably at least 700 tons.

The invention will now be explained in more detail with reference to the drawings, without however being limited thereto and wherein:

BRIEF DESCRIPTION OF THE DRAWINGS

FIGS. 6A and 6B schematically show a view from above and a side view respectively of the embodiment of FIG. 1 in a final step of the method according to the invention; and finally FIG. 7 schematically shows a perspective view of another embodiment of the device according to the invention.

DETAILED DESCRIPTION

Figure 1:
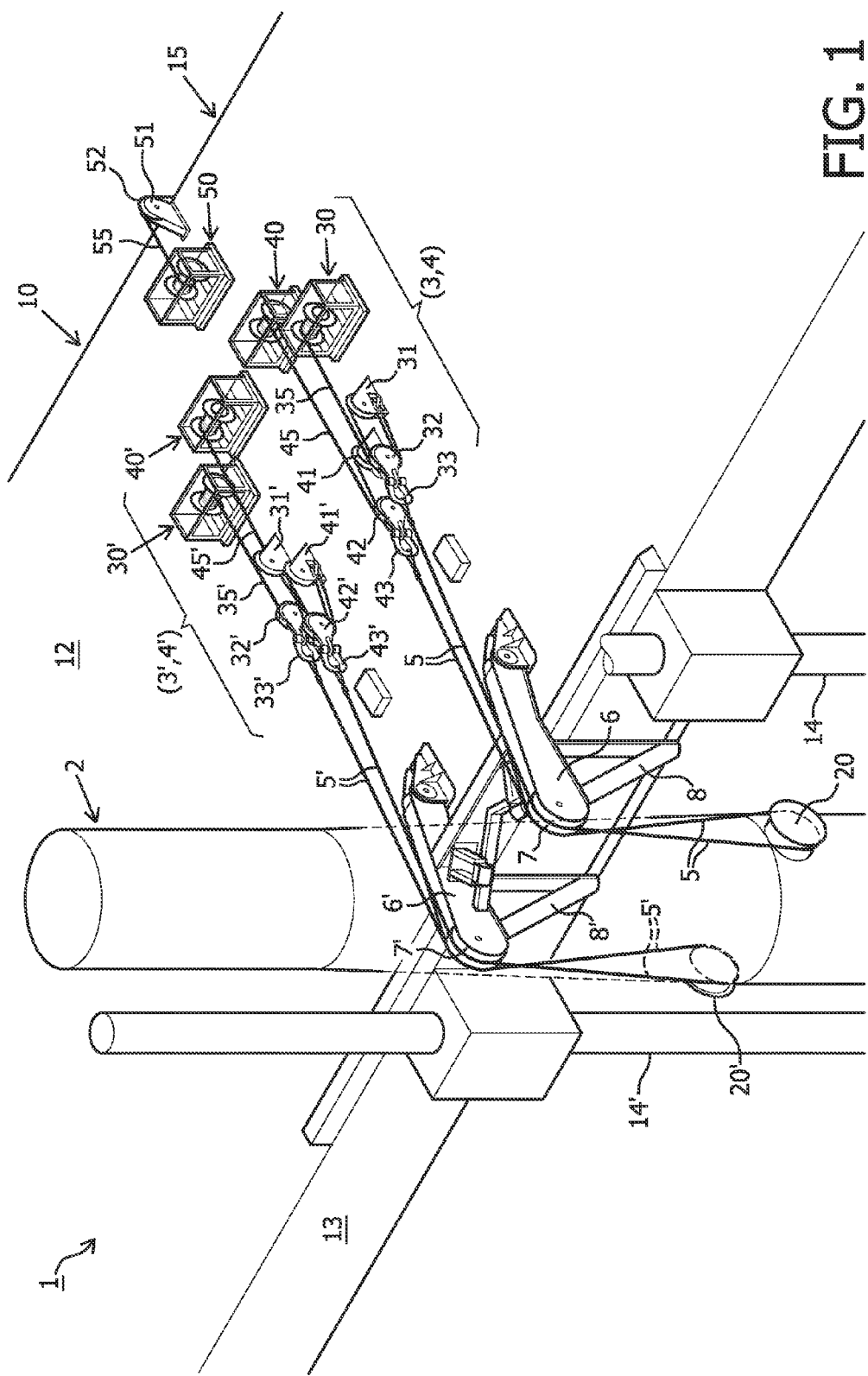
FIG. 1 schematically shows a perspective view of an embodiment of the device according to the invention.
Figure 2A:
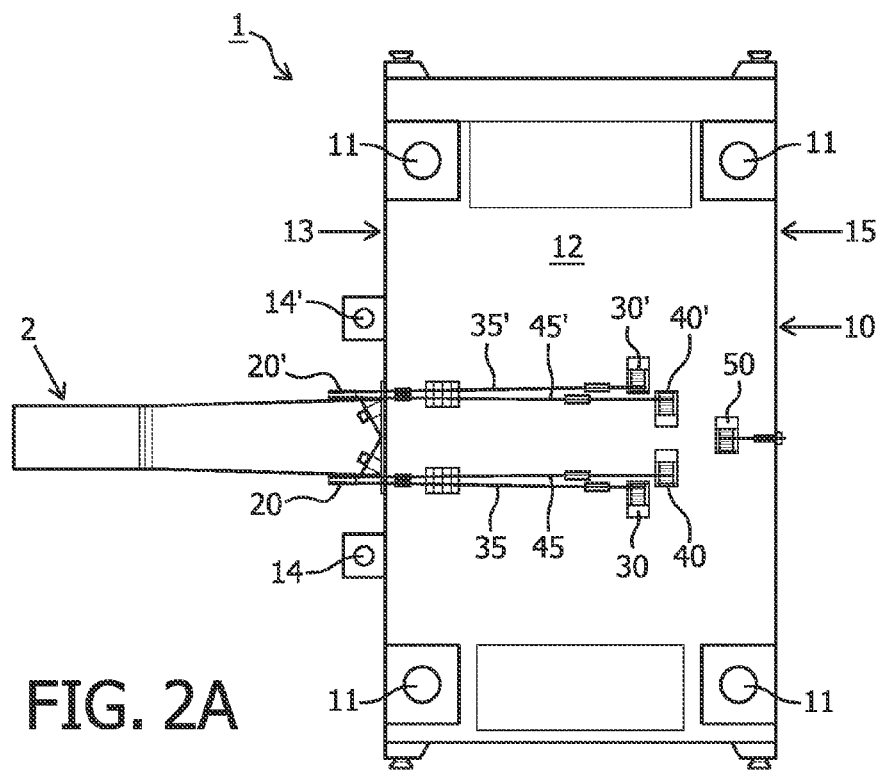
FIGS. 2A and 2B schematically show a view from above and a side view respectively of the embodiment of FIG. 1 in a first step of the method according to the invention.
Figure 2B:
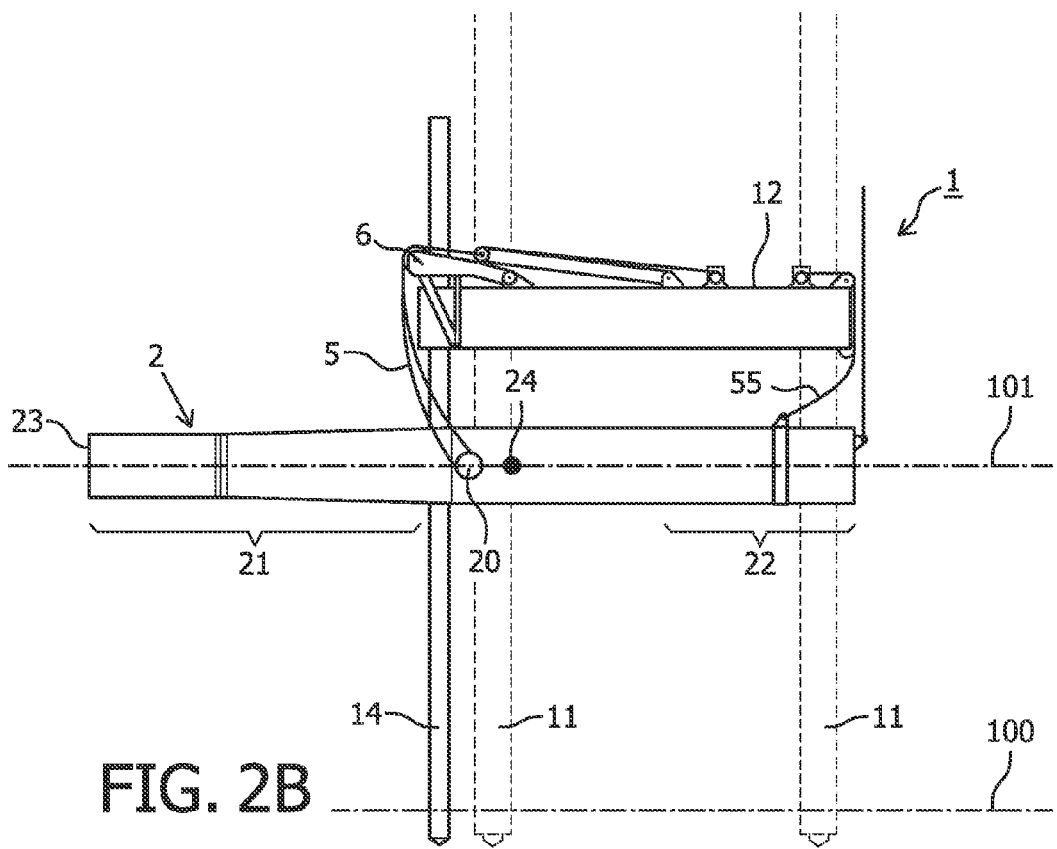

Referring to FIGS. 1 and 2, an embodiment of a device 1 for erecting monopile 2 of a wind turbine is shown. Device 1 comprises a jack-up platform 10 provided with spud poles 11 at its four corners, and a work deck 12. The platform 10 is stabilized by lowering the spud poles 11 until they take support onto or into the seabed 100. The work deck 12 may in this stabilized position be raised above sea level 101 by jacking it upwards along the spud poles 11, as shown in FIG. 2B for instance. To work deck 12 are connected a pair of first and second fixation means (3, 4) for a tension cable 5, as well as guiding means for tension cable 5 in the form of a hoist bracket 6. Hoist bracket 6 extends over an edge 13 of work deck 12 and is provided with a sheave 7. Hoist bracket 6 is supported by member 8, which is connected to and supported by the side 13. A second pair of first and second fixation means (3', 4') for a second tension cable 5' are also connected to work deck 12, as well as adding means for tension cable 5' in the form of a hoist bracket 6'. As with hoist bracket 6, hoist bracket 6' extends over an edge 13 of work deck 12 and is provided with a sheave 7'. Hoist bracket 6' is supported by member 8', which is connected to and supported by the side 13.

The first fixation means 3 comprise a winch 30 and a compound pulley, which is a combination of a fixed pulley 31 and a movable pulley 32. Fixed pulley 31 is connected to work deck 12, while movable pulley 32 is trailing. Compound pulley (31, 32) is a block and tackle, i.e. comprises several sheaves mounted on each axle or one sheave with several grooves. A tension cable 35 is at one end attached to fixed pulley 31, runs to the movable pulley 32, is wound around its sheave and returns to fixed pulley 31 where it is wound around its sheave before running to the movable pulley again. This loop is repeated a desired number of times before tension cable 35 is led to winch 30 where it is wound up.

In operation the tension cable 5 is attached to the first fixation means 3 by a shackle 33, connected to movable pulley 32, is guided along the sheave 7 of hoist bracket 6 and around attachment means in the form of bollard 20, that is welded on the monopile 2, and led back along the sheave 7 of hoist bracket 6 to the second fixation means 4 to form a sling. The second fixation means 4 comprise similar components as the first fixation means 3 and their description will not be repeated here. The sling formed by tension cable 5 can be shortened (thereby pulling on bollard 20) or lengthened (thereby lowering bollard 20) by winding up or winding down the cable 35 with the aid of winch 30. In the same way, a tension cable 5' is attached to the first fixation means 3' by a shackle 33', connected to movable pulley 32', is guided along the sheave 7' of hoist bracket 6' and around attachment means in the form of bollard 20', that is welded on the monopile 2, and led back along the sheave 7' of hoist bracket 6' to the second fixation means 4' to form a sling. The sling formed by tension cable 5' can be shortened (thereby pulling on bollard 20') or lengthened (thereby lowering bollard 20') by winding up or winding down the cable 35' with the aid of winch 30'.

In the embodiment shown, platform 10 comprises additional spud poles (14, 14') that are arranged at the edge 13 of work deck 12 on both sides of hoist brackets (6, 6') and in proximity thereof. Additional spud poles (14, 14') that take support onto or into the sea bed, prevent the platform 10 from tilting to an undesirable level during operations. To the work deck are connected further fixation means in the form of a winch 50 that is able to wind up or wind down a further tension cable 55. Tension cable 55 is guided along further guiding means in the form of a hoist bracket 51 with sheave 52, provided at an edge 15 opposite the edge 13. In operation, tension cable 55 is attached to the monopile 2 at a rear end thereof.

With reference to FIGS. 2 to 6, several steps of an embodiment of the method for erecting the monopile 2 are shown. The method comprises providing a device as has been described in detail above. The platform 1 is first put in a jacked-up position by lowering the spud poles 11 until they take support into or onto the seabed 100, and then raising the work deck 12 with respect to the spud poles 11 until the desired height of the work deck is reached. Work deck is then above sea level 101.

A monopile 2 which has been transported from the shore to the off-shore platform 1 by closing off its two open ends with closure caps of steel or another suitable material such that it is able to float in the water in a substantially horizontal position, is then brought at least partly underneath the work deck 12 of platform 1 in this substantially horizontal floating condition. A top end part 21 of monopile 2 is brought more or less underneath the edge 13 between the brackets (6, 6') and a rear end 22 thereof more or less underneath the edge 15 of bracket 51. With the monopile 2 in this position, the slings formed by tension cable 5 and 5' are slung around the bollards 20 and 20' respectively, and the rear cable 55 is likewise attached to the rear end 22, for instance by forming a loop. Bollards (20, 20') on monopile 2 are located between the top end 23 of monopile 2 and its center of gravity 24, and more preferably relatively close to the center of gravity 24. In this position, the two closure caps are then removed which allows the monopile 2 to fill with water.

Figure 3A:
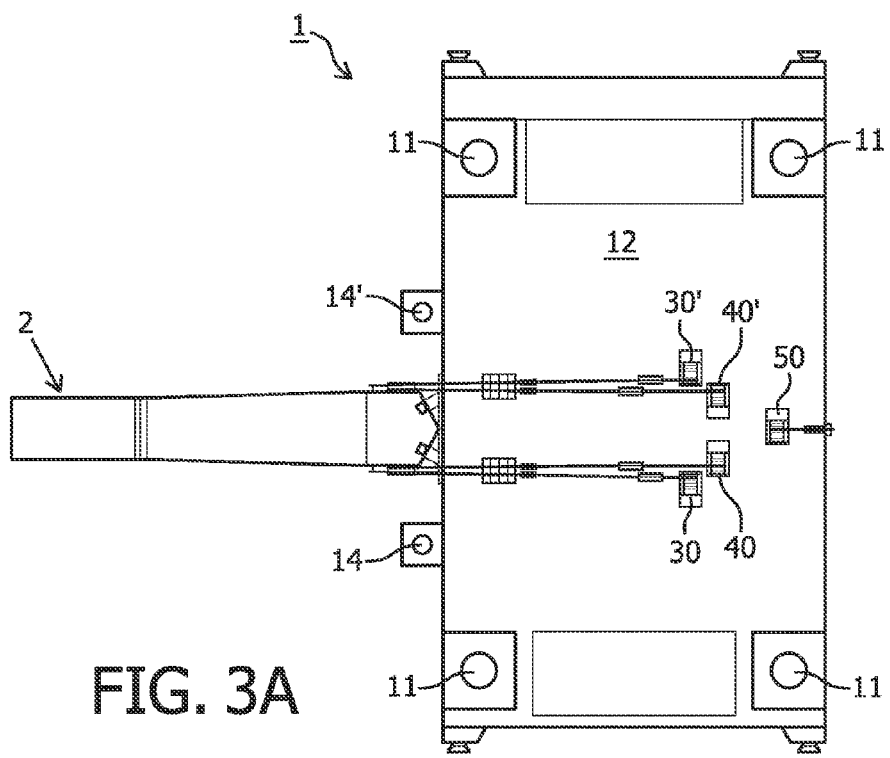
FIGS. 3A and 3B schematically show a view from above and a side view respectively of the embodiment of FIG. 1 in a next step of the method according to the invention.
Figure 3B:
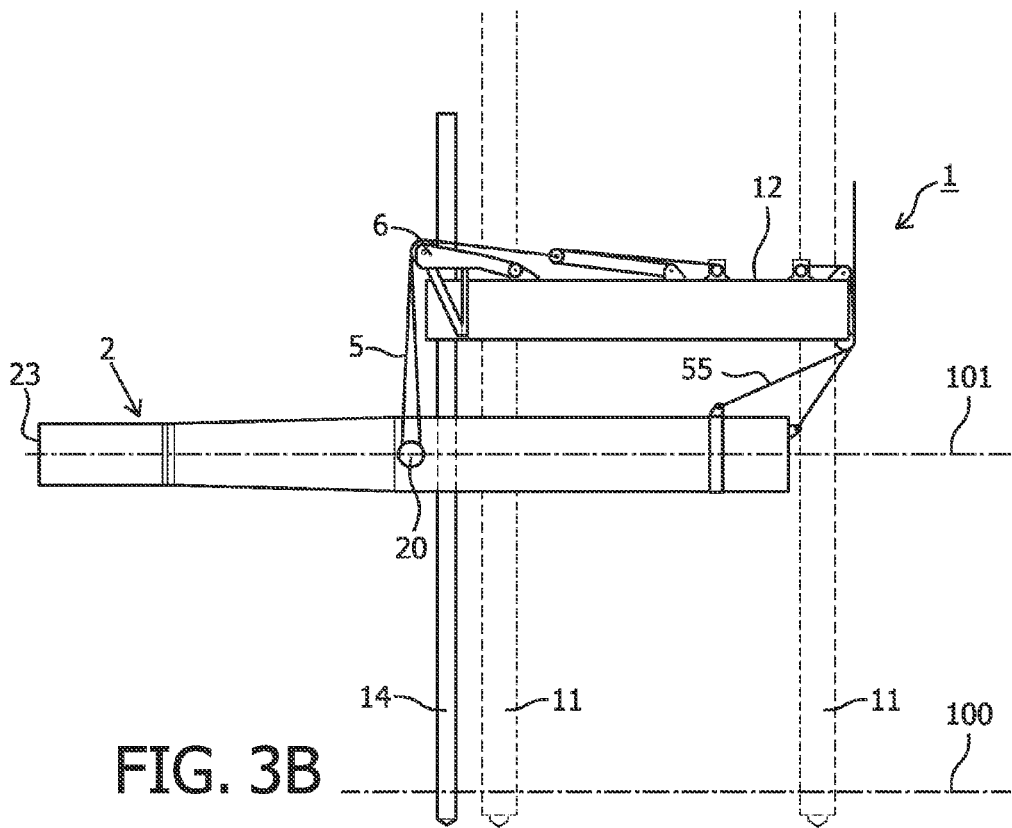

As shown in FIGS. 1A and 3B, the tension cables 5 and 55 are then straightened by winding up cables (35, 45, 35', 45') on winches (30, 40, 30', 40'), and cable 55 on winch 50.

Figure 4A:
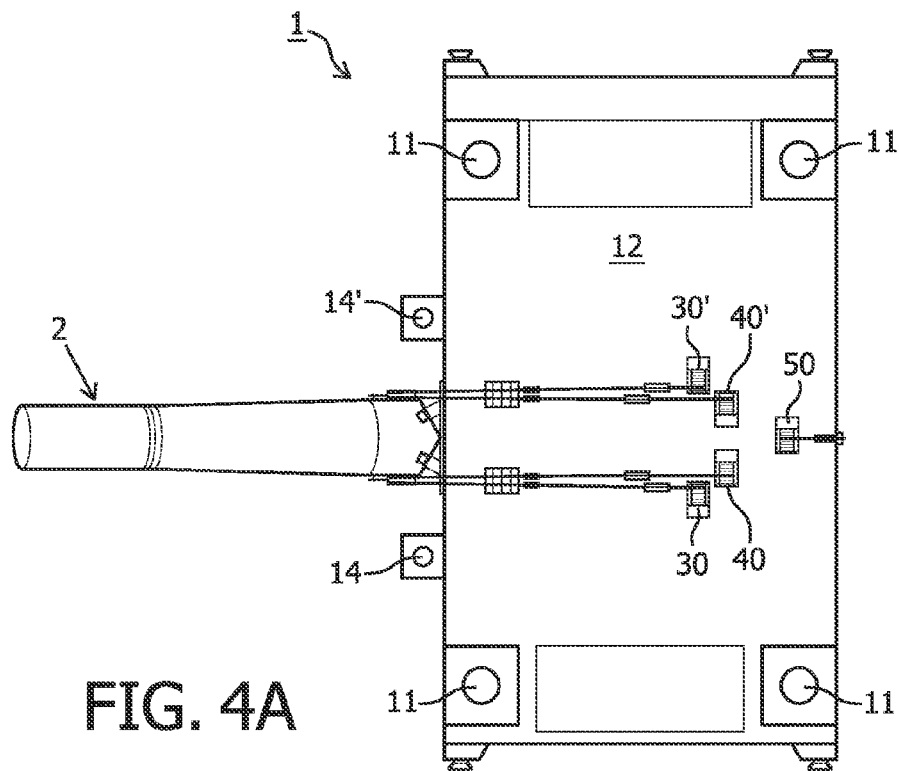
FIGS. 4A and 4B schematically show a view from above and a side view respectively of the embodiment of FIG. 1 in another next step of the method according to the invention.
Figure 4B:
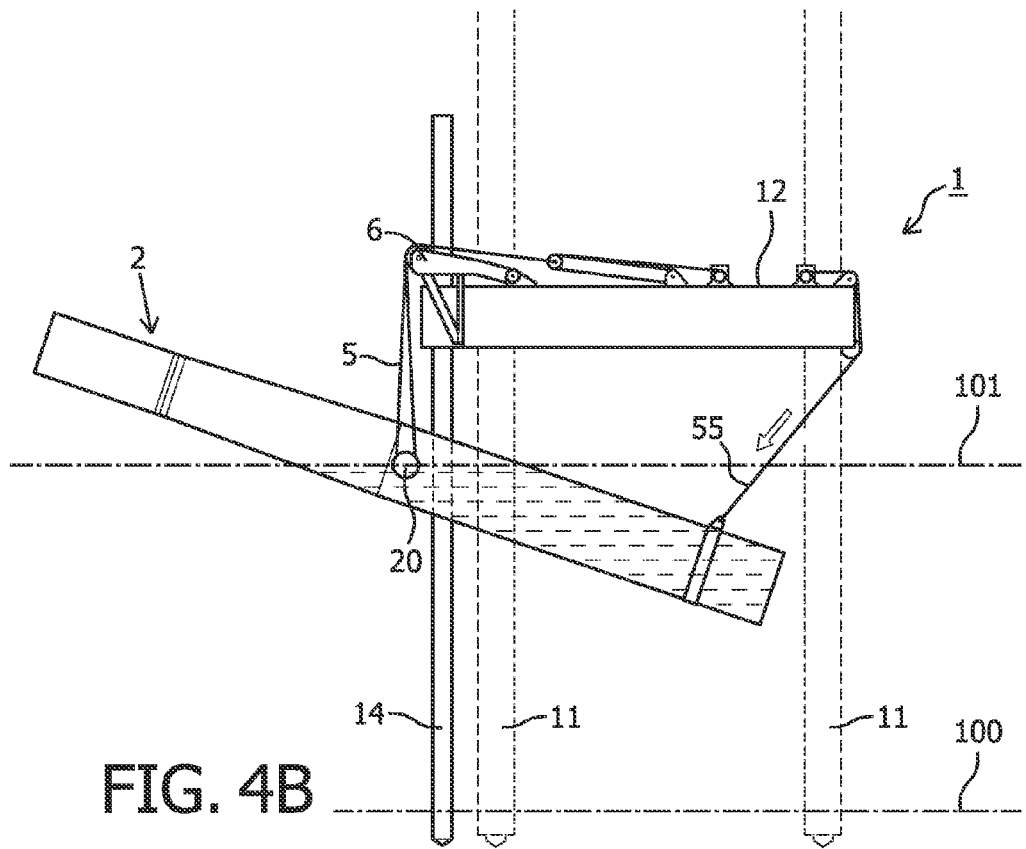
Figure 5A:
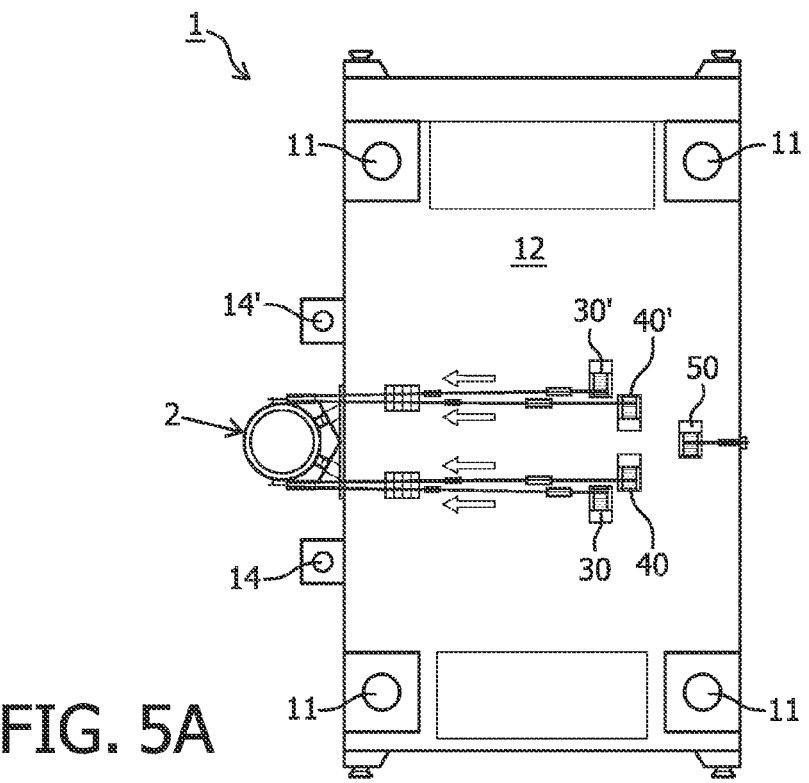
FIGS. 5A and 5B schematically show a view from above and a side view respectively of the embodiment of FIG. 1 in yet another step of the method according to the invention.
Figure 5B:
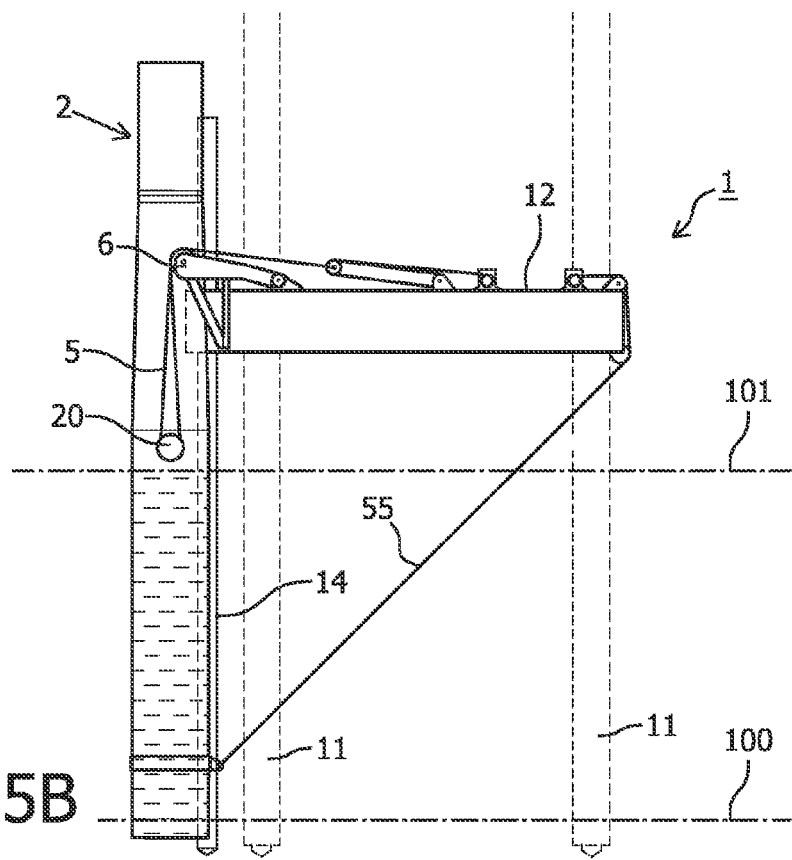

As shown in the sequence of FIGS. 4 and 5, the monopile 2 is then pulled in an erected position (FIG. 5) along the edge 13 of work deck 12, in which it gradually fills up with water. In this process, the rear cable 55 is gradually lengthened.

In a last step of the method the monopile 2 is driven into the seabed under the action of a hydraulic hammer 25, known per se in the art. If desired a hydraulic hammer 25 with follower may be used. Once the monopile 2 is driven to target depth a transition piece is fitted onto the monopile and the annulus between the monopole and transition piece is grouted making an extremely strong connection. A tower of for instance a wind turbine may then be put onto the transition piece, according to known methods.

Figure 7:
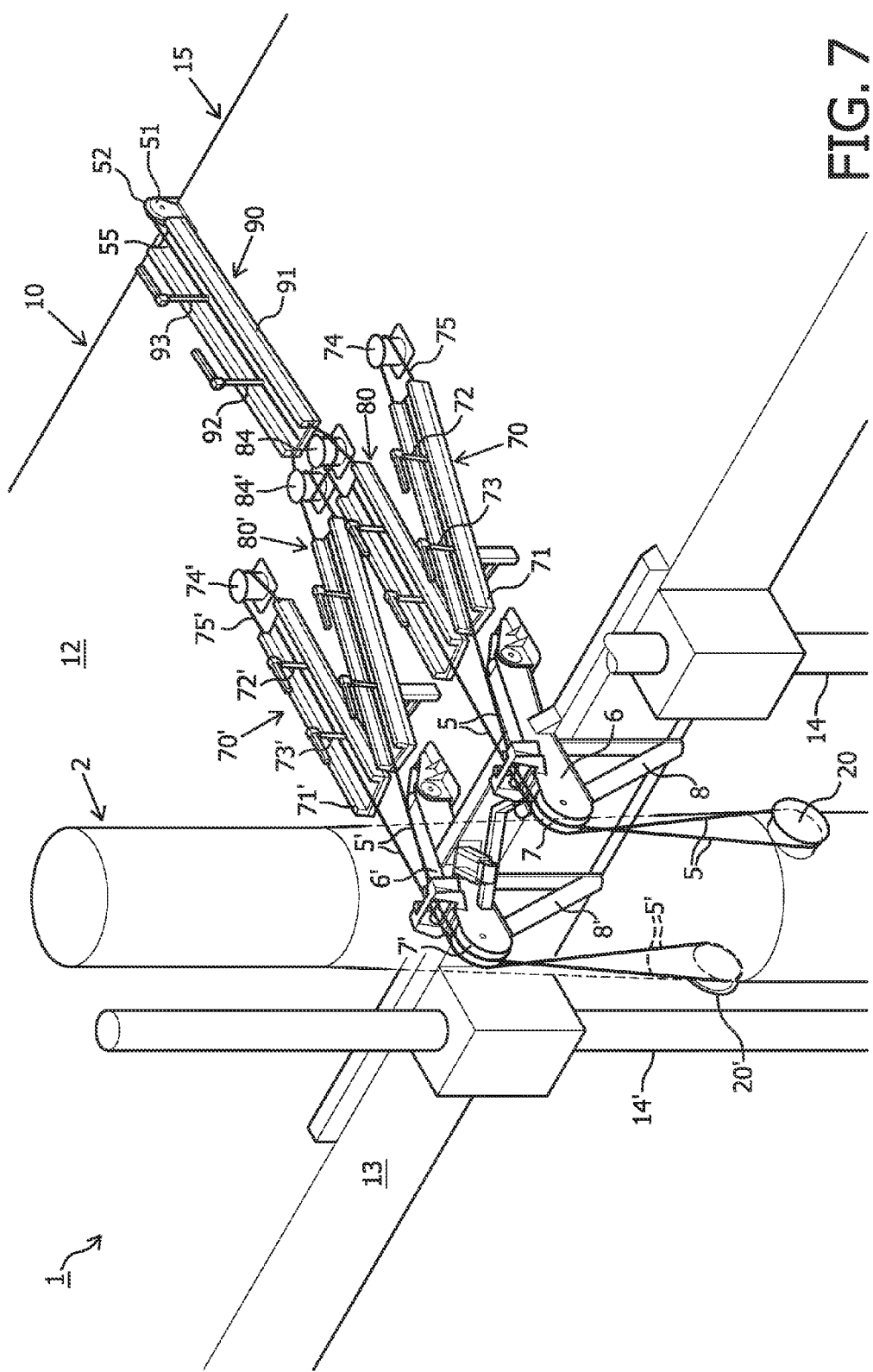

The embodiment of the method and device described above was based on the use of drum winches and pulleys. With reference to FIG. 7 another preferred embodiment of the device according to the invention is shown. This embodiment will be described in relation to the device only, the method using this embodiment being substantially similar as the method described for the embodiment using drum winches and pulleys. In the embodiment of FIG. 7, the fixation means and the further fixation means comprise linear winches (70, 80, 70', 80') and 90. The components of a linear winch will be described by reference to linear winch 70 onloy but it is to be understood that linear winches 70', 80, 80' and 90 have similar components. Linear winch 70 comprises a steel frame 71 designed to withstand a rated load and attached firmly to work deck 12 by bollard 74 and cable 75. Linear winch 70 comprises two cable grips 72 and 73, which are guided by runners on the frame 71 and may be moved along the longitudinal direction of the frame by two hydraulic cylinders (not shown). The two cable grips 72 and 73 catch the tension cable 5 intermittently thereby allowing to pull or pay out cable 5, as desired. A hydraulic power unit (not shown) is used to power the linear winch.

The method and device according to the invention allow the provision of a monopile foundation in an efficient manner, obviating the need for large cranes on the platform, and requiring less time than the known method. The method is less dependent on weather conditions moreover.

The invention claimed is:

1. A method for erecting at sea a large slender body, the method comprising:
   providing a device having a jack-up platform provided with spud poles for taking support onto an underwater bottom, and with a work deck to which are connected fixation means for a tension cable and guiding means that are provided at an edge of the work deck, the fixation means and guiding means being positioned at work deck height, whereby in operation the tension cable is attached to the fixation means, is guided along the guiding means and attached to the large slender body, the fixation means being adapted to lengthen or shorten the tension cable;
   with the platform in a jacked-up position, bringing the large slender body in a substantially horizontal floating condition at least partly underneath the work deck of the platform such that a top end thereof is underneath the edge of the guiding means;
   attaching the tension cable to the slender body; and
   pulling on the tension cable using the fixations means and thereby;
   gradually bringing the slender body in an erected position along the edge of the work deck; and optionally
   driving the slender body into the under water bottom.

2. The method according to claim 1, wherein to the work deck are connected further fixation means for a further tension cable, and further guiding means that are positioned at an edge opposite the edge of the guiding means, whereby in operation the further tension cable is attached to the large slender body at a rear end thereof, and the further tension cable is lengthened or shortened by the further fixation means.

3. The method according to claim 1, wherein the fixation means comprise first and second fixation means, and wherein the tension cable is attached to the first fixation means, is guided along the guiding means and around attachment means, provided on the large slender body and led back along the guiding means to the second fixation means to form a sling.

4. The method according to claim 3, wherein the device comprises two pairs of first and second fixation means, and two tension cables that are each attached to the first fixation means of a pair, guided along the guiding means and around attachment means, provided on the large slender body and led back along the guiding means to the second fixation means of a pair to form a sling.

5. The method according to claim 1, wherein attachment means of the large slender body are located between the top end thereof and its center of gravity.

6. The method according to claim 1, wherein the slender body is a monopile for a wind turbine and is driven into the under water bottom by a hydraulic hammer.

7. The method according to claim 1, further comprising the step of connecting a wind turbine to the erected slender body.

8. The method according to claim 1, wherein the fixation means comprises winches.

9. The method according to claim 2, wherein the fixation means comprises winches.

10. The method according to claim 2, wherein the further fixation means comprises winches.

11. The method according to claim 1, wherein the fixation means comprises a movable pulley.

12. The method according to claim 2, wherein the fixation means comprises a movable pulley.

13. The method according to claim 2, wherein the further fixation means comprises a moveable pulley.

14. The method according to claim 1, wherein the fixation means comprises a compound pulley.

15. The method according to claim 2, wherein the compound pulley comprises a block and tackle.

16. The method according to claim 2, wherein the fixation means comprises a compound pulley.

17. The method according to claim 16, wherein the compound pulley comprises a block and tackle.

18. The method according to claim 2, wherein the further fixation means comprises a compound pulley.

19. The method according to claim 18, wherein the compound pulley comprises a block and tackle.

20. The method according to claim 1, wherein the guiding means comprises a hoist bracket that extends over the edge of the work deck and is provided with a sheave.

21. The method according to claim 1, wherein the platform comprises additional spud poles arranged at the edge of the work deck on both sides of the guiding means and in proximity thereof.

* * * * *